United States Patent [19]
Magadanz

[11] Patent Number: 5,918,939
[45] Date of Patent: Jul. 6, 1999

[54] SEAT RECLINER WITH MEMORY DUMP MECHANISM

[75] Inventor: Lawrence J. Magadanz, Clinton Twp., Mich.

[73] Assignee: Fisher Dynamics Corporation, St. Clair Shores, Mich.

[21] Appl. No.: 08/824,925

[22] Filed: Mar. 27, 1997

[51] Int. Cl.$^6$ ....................................................... B60N 2/02
[52] U.S. Cl. ................ 297/378.12; 297/375; 297/362.14
[58] Field of Search .......................... 297/378.12, 378.14, 297/362.14, 367, 373, 375

[56] References Cited

U.S. PATENT DOCUMENTS

| | | |
|---|---|---|
| 3,328,076 | 6/1967 | Naef . |
| 3,635,525 | 1/1972 | Magyar . |
| 3,736,025 | 5/1973 | Ziegler et al. . |
| 3,957,312 | 5/1976 | Bonnaud . |
| 4,065,178 | 12/1977 | Carella et al. . |
| 4,394,047 | 7/1983 | Brunelle . |
| 4,502,730 | 3/1985 | Kazaoka et al. . |
| 4,579,386 | 4/1986 | Rupp et al. . |
| 4,660,886 | 4/1987 | Terada et al. . |
| 4,799,733 | 1/1989 | Beley et al. . |
| 4,822,101 | 4/1989 | Hosoe . |
| 4,865,386 | 9/1989 | Detloff et al. . |
| 4,881,775 | 11/1989 | Rees . |
| 4,898,424 | 2/1990 | Bell . |
| 4,925,228 | 5/1990 | Pipon et al. . |
| 5,052,752 | 10/1991 | Robinson . |
| 5,269,588 | 12/1993 | Kunz et al. . |
| 5,280,999 | 1/1994 | Jones et al. . |
| 5,299,853 | 4/1994 | Griswold et al. . |
| 5,320,413 | 6/1994 | Griswold et al. . |
| 5,344,215 | 9/1994 | Dahlbacka . |
| 5,360,256 | 11/1994 | Miller et al. . |
| 5,390,981 | 2/1995 | Griswold . |
| 5,393,123 | 2/1995 | Hernandez et al. . |
| 5,660,440 | 8/1997 | Pejathaya ............................ 297/375 X |
| 5,707,112 | 1/1998 | Zinn ................................... 297/378.14 |

*Primary Examiner*—Laurie K. Cranmer
*Attorney, Agent, or Firm*—Harness, Dickey & Pierce, P.L.C.

[57] ABSTRACT

A seat recliner having a linear recliner mechanism and a memory dump mechanism. The linear recliner mechanism includes a housing fixed to the seat bottom and a recliner rod supported for selective movement relative to the housing. The memory dump mechanism includes a second housing secured to the seatback and which is supported on the recliner rod for movement between a memory position and a free position relative to the recliner rod. A latch assembly is provided for releasably latching the second housing to the recliner rod in the memory position. When the second housing is secured in the memory position, the linear recliner mechanism can be selectively actuated to adjust the reclined position of the seatback between upright and fully-reclined positions. When the latch assembly is actuated, the second housing can be slid toward the free position in response to movement of the seatback toward its dumped position. Optionally, the latch assembly can also function to latch the second housing to the recliner rod in the free position for latching the seatback in its dumped position. Subsequent return of the seatback from its dumped position causes the second housing to again be secured in the memory position so as to locate and retain the seatback in its previously reclined position.

28 Claims, 5 Drawing Sheets

SEAT RECLINER WITH MEMORY DUMP MECHANISM

BACKGROUND OF THE INVENTION

1. Field of the Invention

The present invention relates generally to seat assemblies for motor vehicles and, more particularly, to a seat recliner having a memory dump mechanism which allows the seatback to be moved to a forward dumped position and subsequently returned to its previous reclined position.

2. Description of Background Art

Virtually all motor vehicles are now equipped with front seat assemblies having a recliner mechanism which can be selectively actuated by the seat occupant for adjusting the angular position of the seatback relative to the seat bottom between an upright position and a fully-reclined position. In most two-door vehicles, the front seat assemblies also include a dump mechanism which can be actuated for pivoting the seatback to a forward dumped position to provide greater access to the rear seating area of the vehicle passenger compartment.

In many instances, the recliner mechanism is released in response to actuation of the dump mechanism for permitting the seatback to move its dumped position. Upon the seatback being returned from its dumped position, the recliner mechanism automatically locks the seatback in a predefined position such as, for example, the upright position. Thus, the seat occupant must again release the recliner mechanism to reset the seatback if a different reclined position is preferred. To eliminate this inconvenience, some dump mechanisms further include a memory feature which operates to automatically return the seatback to its previous reclined position following return of the seatback from its dumped position. While a variety of such memory dump mechanisms are currently available, most are relatively complex and expensive. Thus, a continuing need exists to develop alternative dump mechanisms which provide the memory feature in an arrangement that is simple in construction, less expensive to produce and which can be adapted for use with existing recliner mechanisms.

SUMMARY OF THE INVENTION

Accordingly, it is an object of the present invention to provide a seat recliner for use in a seat assembly having a seatback and a seat bottom. The seat recliner is equipped with a memory dump mechanism operable to permit selective forward movement of the seatback to its dumped position and which is further operable to subsequently relatch the seatback in its previous reclined position following return of the seatback from its dumped position.

As a further object of the present invention, the seat recliner has the memory dump mechanism installed between a linear recliner mechanism and the seatback. The memory dump mechanism is operable in a latched mode for coupling the linear recliner mechanism to the seatback such that the linear recliner mechanism can be independently and selectively actuated for adjusting the reclined position of the seatback. The dump mechanism is further operable in an unlatched mode for releasing the seatback from coupled engagement with the linear recliner mechanism, thereby permitting the seatback to be pivoted toward its dumped position without actuating the linear recliner mechanism.

In accordance with yet another object of the present invention, the linear recliner mechanism is normally operable in a locked mode for inhibiting angular movement of the seatback and can be selectively shifted into a released mode for permitting reclining movement of the seatback while the memory dump mechanism is maintained in its latched mode.

These and other objects are obtained by providing a seat recliner having a linear recliner mechanism operable for permitting selective reclining movement of a seatback relative to a seat bottom between an upright position and a fully-reclined position. The seat recliner further includes a memory dump mechanism operable to permit the seatback to be pivoted from any reclined position to a forward dumped position. Upon return of the seatback from its forward dumped position, the memory dump mechanism is adapted to relatch the seatback in its previous reclined position. More specifically, the seat recliner includes a first housing secured to the seat bottom, a second housing secured to the seatback, and a recliner rod having a first end portion supported for sliding movement relative to the first housing and a second end portion supported for sliding movement relative to the second housing. In addition, the seat recliner includes a recline latch assembly for releasably locking the first end portion of the recliner rod to the first housing, and a recline actuator for controlling actuation of the recline latch assembly. The seat recliner further includes a dump latch assembly for releasably locking the second end portion of the recliner rod to the second housing, and a dump actuator for controlling actuation of the dump latch assembly. The recline latch assembly is normally operable in a locked mode and the dump latch assembly is normally operable in a latched mode for latching the respective end portions of the recliner rod to the first and second housings, thereby retaining the seatback in a selected reclined position. The recline latch assembly is also operable in a released mode wherein the first end portion of the recliner rod is free to move linearly relative to the first housing. Likewise, the dump latch assembly is also operable in an unlatched mode to permit the second housing to move linearly relative to the second end portion of the recliner rod.

When it is desired to adjust the reclined position of the seatback, the recline actuator is actuated by a seat occupant to selectively shift the recline latch assembly from its locked mode into its released mode while the dump latch assembly is maintained in its latched mode. Thus, the first end portion of the recliner rod is permitted to move relative to the first housing, thereby permitting a corresponding adjustment in the reclined position of the seatback. When it is desired to move the seatback to its forward dumped position, the dump actuator is selectively actuated for shifting the dump latch assembly into its unlatched mode while the recline latch assembly is maintained in its locked mode. This permits second housing to slide on the second end portion of the recliner rod from a first position to a second position in response to forward dumping of the seatback. Dump latch assembly is held in its unlatched mode during movement of the second housing toward the second position. When the seatback is returned from its dumped position to its previous reclined position, the second housing is caused to slide on the second end portion of the recliner rod from the second position to the first position whereat dump latch assembly shifts back into its latched mode.

As a further feature of the present invention, the dump latch assembly can be shifted into its latched mode for releasably latching the second housing in the second position while the recline latch assembly is maintained in its locked mode, thereby retaining the seatback in its forward dumped position. When it is desired to return the seatback to its previous reclined position, the dump actuator is selectively actuated for shifting the dump latch assembly into its unlatched mode for permitting the second housing to slide on the second end portion of the recliner rod from the second position to the first position in response to movement of the seatback toward its previous reclined position. When the seatback is located in its previous reclined position, the dump latch assembly automatically shifts back into its latched mode.

According to another alternative arrangement, the first end portion of the recliner rod can be immovably fixed to the first housing such that the memory dump mechanism permits forward dumping of the seatback in a non-reclining seat assembly.

Further scope of applicability of the present invention will become apparent from the detailed description given hereinafter. However, it should be understood that the detailed description and specific example, while indicating preferred embodiments of the invention, is given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

Figure 1:
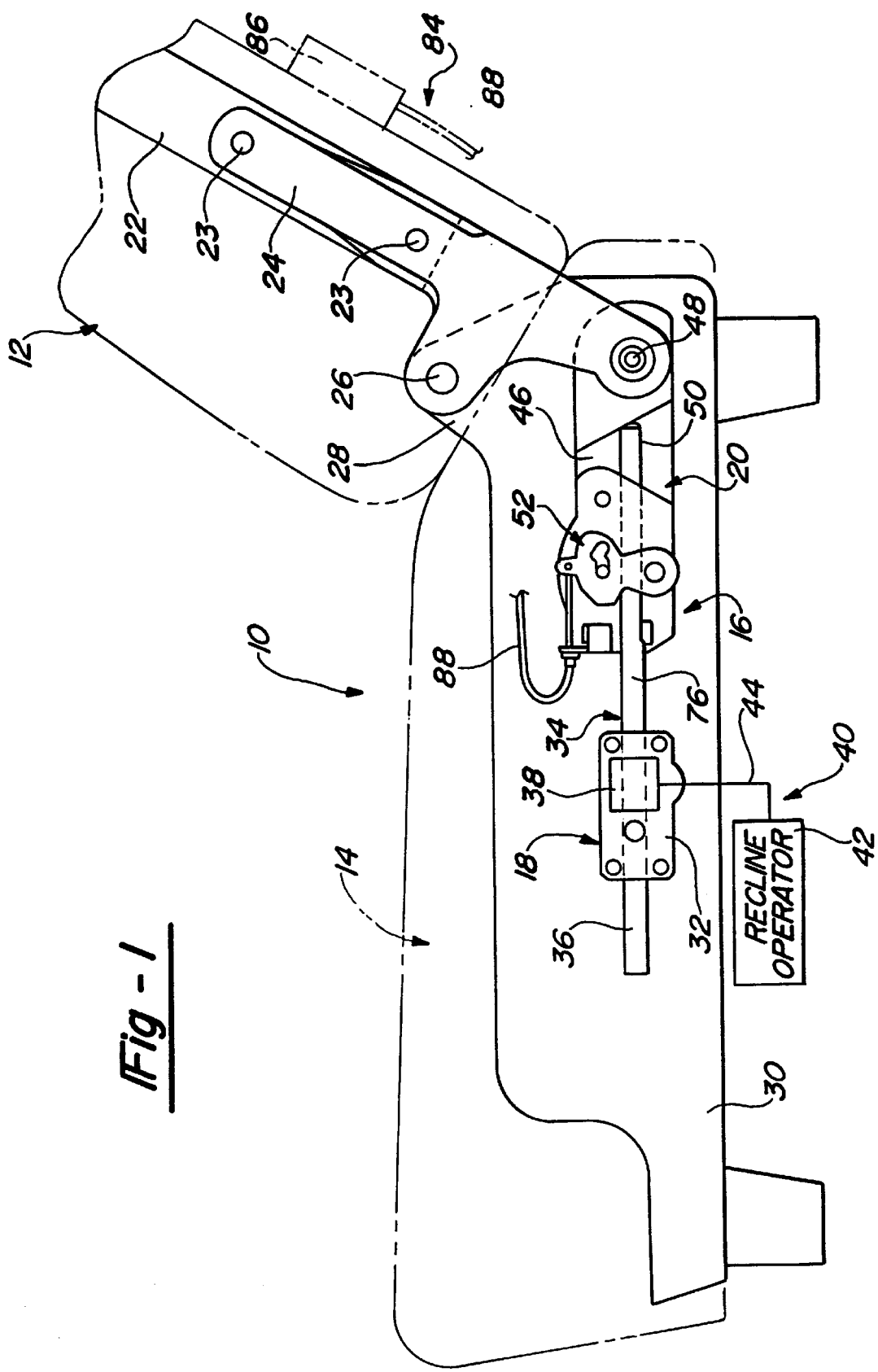
FIG. 1 is a side view showing the seat recliner of the present invention installed in a seat assembly.

With reference to the drawings, a seat assembly 10 is shown to include a seatback 12, a seat bottom 14, and a seat recliner 16 interconnecting seatback 12 to seat bottom 14 for rearward (i.e., "reclining") and forward (i.e., "dumping") angular movement relative thereto. Seat recliner 16 includes a linear recliner mechanism 18 normally operable in a "locked" mode and a memory dump mechanism 20 normally operable in a "latched" mode for holding seatback 12 in a desired reclined position relative to seat bottom 14. As will be disclosed, when it is desired to adjust the angular position of seatback 12, linear recliner mechanism 18 is selectively shifted into a "released" mode while memory dump mechanism 20 is maintained in its latched mode for permitting adjustment of the reclined position of seatback 12 between an upright position and a fully-reclined position. When it is desired to move seatback 12 from its reclined position to a forward dumped position and then subsequently return seatback 12 to its last or "previous" reclined position, memory dump mechanism 20 is selectively shifted into an "unlatched" mode while linear recliner mechanism 18 is maintained in its released mode.

Memory dump mechanism 20 is operably installed between linear recliner mechanism 18 and seatback 16 and is supported for fore and aft movement relative to linear recliner mechanism 18 which, in turn, permits angular movement of seatback 12 between its reclined position and its dumped position. In particular, when memory dump mechanism 20 is in its latched mode, it is retained in a first or memory position with respect to linear recliner mechanism 18. With dump mechanism 20 located in the memory position, the seat occupant can selectively adjust the reclined position of seatback 12 by shifting linear recliner mechanism 18 into its released mode. However, when it is desired to dump seatback 12, memory dump mechanism 20 is selectively shifted into its unlatched mode such that subsequent forward angular movement of seatback 12 toward its dumped position causes rearward sliding movement of memory dump mechanism 20 relative to linear recliner mechanism 18 from the memory position to a second or free position. Upon return of seatback 12 from its dumped position, memory dump mechanism 20 is slid forwardly from the free position to the memory position whereat memory dump mechanism 20 is automatically shifted into its latched mode and again retained in the memory position relative to linear recliner mechanism 18, whereby seatback 12 is retained in its previous reclined position.

Seatback 12 has an underlying frame structure which includes a pair of laterally-spaced side rails 22, one of which is shown. The lower end of each side rail 22 is fixed, such as by fasteners 23, to a pivot rail 24 which, in turn, is pivotally attached by a hinge pin 26 to an upstanding flange segment 28 formed on a side beam 30 of the seat pan or other underlying frame structure of seat bottom 14. As such, seatback 12 is supported for angular movement relative to seat bottom 14 and seat recliner 16 functions to control such angular movement. As an alternative to that shown, the seat pan can be mounted to the sliding upper rail in seat assemblies equipped with an adjustable seat slide device and/or pivot rails 24 can be formed integrally with side rails 22.

Linear recliner mechanism 18 is shown to include a housing 32 secured to side beam 30 of seat bottom 14, and a recliner rod 34 having a first end portion 36 supported within housing 32 for sliding movement relative to a recline latch assembly, schematically shown by block 38. While not specifically shown, it is contemplated that a latching element associated with recline latch assembly 38 is adapted to releasably engage first end portion 36 of recliner rod 34. Thus, linear recliner mechanism 18 is defined as operating in its locked mode when the latching element of recline latch assembly 38 lockingly engages first end portion 36 of recliner rod 34 so as to inhibit movement thereof relative to housing 32. In contrast, linear recliner mechanism 18 is defined as operating in its released mode when the latching element of recline latch assembly 38 is disengaged from first end portion 36 of recliner rod 34 for permitting fore and aft sliding movement thereof relative to housing 32.

A particular construction for linear recliner mechanism 18 is not critical to the present invention, since the principal features of novelty are directed to utilization of memory dump mechanism 20 with any suitable linear recliner mechanism for use in seat recliner 16. Thus, virtually any known linear recliner mechanism can be adapted for use with the present invention, with such considered to be equivalent to the structure disclosed. Specifically, linear recliner mechanism 18 may be infinitely adjustable between a fully-upright position and a fully-reclined position or, in the alternative, provide a finite number of incremental adjustment positions therebetween. Moreover, such linear recliner mechanisms may be manually-actuated or power-operated. For example, a manually-actuated infinitely-adjustable linear recliner mechanism is disclosed in commonly-owned U.S. Pat. No. 5,052,752 while a power-operated version is disclosed in commonly-owned U.S. Pat. No. 4,962,963.

To provide means for controlling actuation of recline latch assembly 38 for establishing the locked and released modes of linear recliner mechanism 18, seat recliner 16 includes a recline actuator 40. According to the embodiment shown, recline actuator 40 includes an operator, schematically shown by block 42, that is connected via a coupling, schematically shown by lead-line 44, to the latching element of recline latch assembly 38. As will be appreciated by those skilled in the art, recline operator 42 may be a manually-operable recliner handle and coupling 44 may be a bowden cable connecting the recline handle to recline latch assembly 38. Alternatively, operator 42 may be a switch which is electrically connected to a power-operated motor which, under the control of the seat occupant, causes linear recliner mechanism 18 to shift from its locked mode into its released mode. As is also conventional, recline latch assembly 38 includes an arrangement for normally maintaining linear recliner mechanism 18 in its locked mode. As such, intentional and deliberate manipulation of operator 42 is required to permit reclining movement of seatback 12 relative to seat bottom 14.

In accordance with the present invention, memory dump mechanism 20 includes a housing 46 pivotally attached to pivot rail 24 by a hinge pin 48, and on which a second end portion 50 of recliner rod 34 is supported for movement relative to a dump latch assembly 52. A latching element associated with dump latch assembly 52 is adapted to selectively engage second end portion 50 of recliner rod 34. Thus, memory dump mechanism 20 is defined as operating in its latched mode when the latching element of dump latch assembly 52 lockingly engages recliner rod 34 so as to inhibit movement of housing 46 relative thereto. In contrast, memory dump mechanism 20 is defined as operating in its unlatched mode when the latching element of dump latch assembly 52 is released from locked engagement with recliner rod 34 for permitting fore and aft sliding movement of housing 46 relative thereto.

To provide means for permitting selective sliding movement of housing 46 relative to second end portion 50 of recliner rod 34, dump latch assembly 52 includes a locking pawl 54 having locking teeth 56 formed thereon. In the particular arrangement shown, locking pawl 54 is pivotally attached to housing 46 by a pivot post 58. Locking pawl 54 has a follower pin 60 extending outwardly therefrom which is retailed in a vertical guide slot (not shown) formed in housing 46. Dump latch assembly 52 also includes a pair of cam plates 62 that are supported on an actuator shaft 64 so as to be located on opposite sides of locking pawl 54. A pin 66 interconnects the upper portion of each cam plate 62 such that cam plates 62 are retained on actuator shaft 64 for synchronous pivotal movement. At least one of cam plates 62 includes a cam slot 68 through which follower pin 60 of locking pawl 54 extends.

Figure 2:
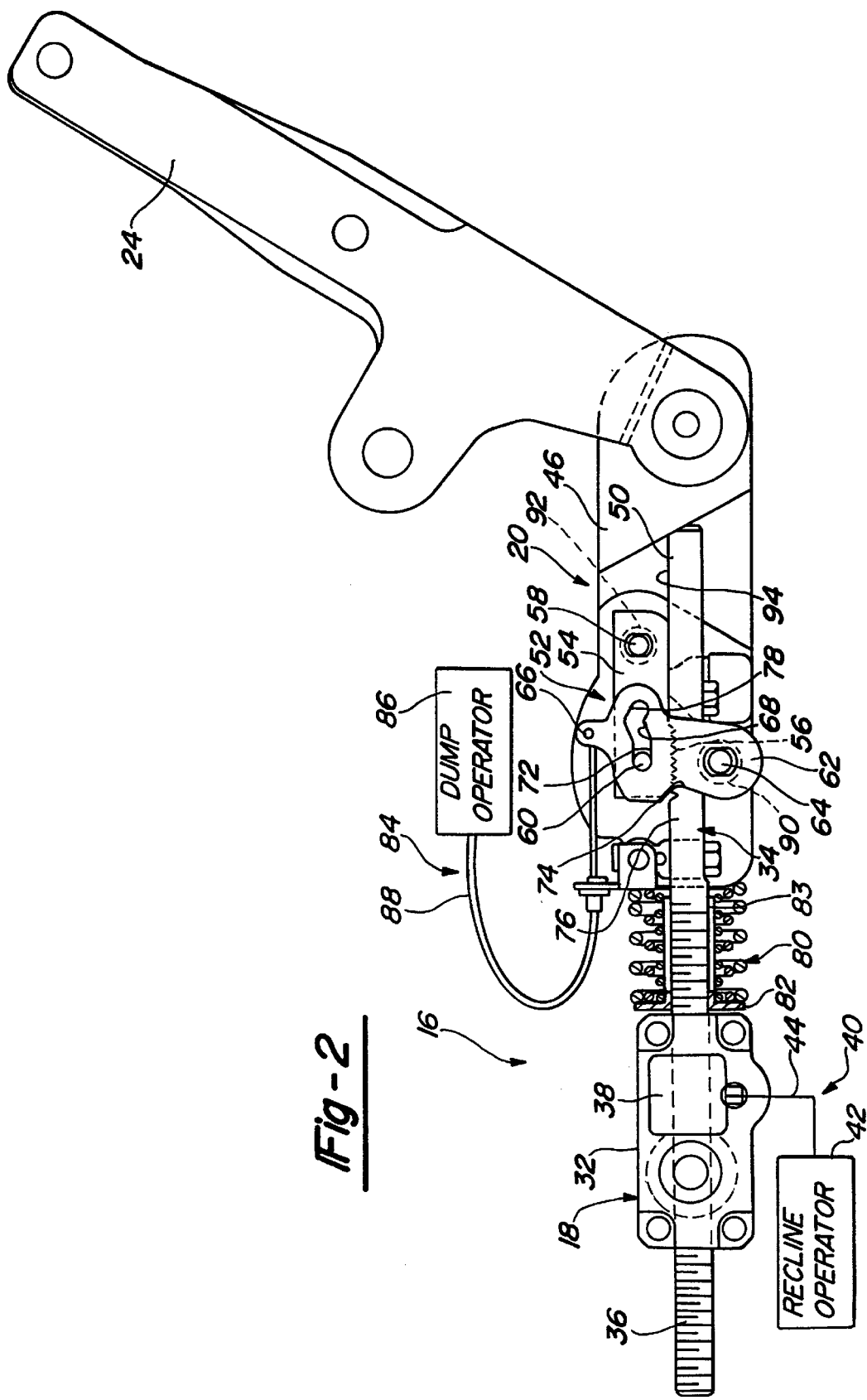
FIG. 2 is an enlarged partial view of in FIG. 1 showing the seat recliner with the seatback latched in a reclined position.

Dump latch assembly 52 is actuated by rotating cam plates 62 which, in turn, causes follower pin 60 to move due to the contour of cam slot 68. As such, the contour of cam slot 68 is designed such that rotation of cam plates 62 causes corresponding pivotal movement of locking pawl 54. In particular, FIG. 2 illustrates cam plates 62 located in a first position whereat follower pin 60 is positioned in a first slot segment 72 of cam slot 68 and locking pawl 54 is located in a locked position. When locking pawl 54 is in the locked position shown, its locking teeth 56 are meshed with a rack of memory teeth 74 formed on an intermediate portion 76 of recliner rod 34, thereby inhibiting linear movement of housing 46 relative to recliner rod 34 and establishing the latched mode of memory dump mechanism 20. Thus, with locking pawl 54 in the locked position shown, housing 46 is releasably latched to recliner rod 34 for establishing a memory position.

When cam plates 62 are rotated in a first (i.e., counterclockwise) direction from their first position to a second position, the contour of cam slot 68 causes follower pin 60 to move from first slot segment 72 into a second slot segment 78 which, in turn, causes locking pawl 54 to pivot in a first direction (i.e., clockwise) from the locked position to a released position. With locking pawl 54 in the released position, locking teeth 56 are displaced from meshed engagement with memory teeth 74 on recliner rod 34, thereby permitting linear movement of housing 46 relative to recliner rod 34 and establishing the unlatched mode of dump mechanism 20. A return spring assembly 80 is mounted over intermediate portion 76 of recliner rod 34 and abuts against housing 46 and a spring retainer 82. Return spring 80 is provided to normally bias seatback 12 in a first (i.e., counterclockwise) direction to assist in moving seatback 12 forwardly. In addition, return spring 80 is shown to encircle a rigid reinforcement tube 83 mounted over intermediate portion 76 of recliner rod 34. Tube 83 is optional and provides additional strength for certain applications such as, for example, when seat assembly 10 is of the "all-belts-to seat" (i.e., structural seats) variety. As an alternative, it is contemplated that locking pawl 54 can be supported for vertical movement between its locked and release positions in response to rotation of cam plates 62 instead of the pivotal movement disclosed.

To rotate cam plates 62 between their first and second positions when it is desired to dump seatback 12, memory dump mechanism 20 is shown to include a dump actuator 84. In the embodiment shown, dump actuator 84 is schematically shown as an operator 86 connected by a coupling 88 to pin 66. Operator 86 can be a manually-operable dump handle connected to dump latch assembly 52 via coupling 88 which, in this instance, is partially shown as a bowden cable assembly. However, any arrangement which is operable under the control of the seat occupant to shift memory dump mechanism 20 from its latched mode into its unlatched mode is contemplated as being equivalent to the arrangement shown for dump actuator 84. A torsion spring 90 is provided on actuator shaft 64 which acts between cam plates 62 and housing 46 for normally biasing cam plates 62 toward their first position which, in turn, biases locking pawl 54 toward the locked position. Thus, the biasing of torsion spring 90 must be overcome before the seat occupant can move operator 86 sufficiently to rotate cam plates 62 from their first position to their second position for moving locking pawl 54 out of the locked position and into the released position and intentionally shift memory dump mechanism 20 into its unlatched mode. Alternatively, torsion spring 90 could be installed between housing 46 and locking pawl 54 for normally biasing locking pawl 54 toward the locked position. A second torsion spring 92 is shown to be acting on locking pawl 54 for biasing it toward the locked position.

The operation of seat recliner 16 will now be described. In FIG. 2, by seat recliner 16 is shown for holding seatback 12 in a reclined position with linear recliner mechanism 18 in its locked mode and memory dump mechanism 20 in its latched mode. When it is desired to adjust the reclination angle of seatback 12, recline operator 42 is actuated by the seat occupant for shifting linear recliner mechanism 18 from its locked mode into its released mode. With linear recliner mechanism 18 in its released mode, recline latch assembly 38 is disengaged from first end portion 36 of recliner rod 34 so as to permit sliding movement of recliner rod 34 relative to housing 32 and seat bottom 14. Thus, fore and aft sliding movement of recliner rod 34 relative to housing 32 results in a corresponding change in the angular relationship between pivot rail 24 and side beam 30 and, in turn, seatback 12 and seat bottom 14. Again it is noted that, during such adjustment of the reclined position of seatback, memory dump mechanism 20 is maintained in its latched mode such that housing 46 moves in concert with recliner rod 34, since housing 46 is held in its memory position relative thereto during adjustment of the reclined position of seatback 12 by engagement of locking pawl teeth 56 with memory teeth 74 on recliner rod 34.

Figure 3:
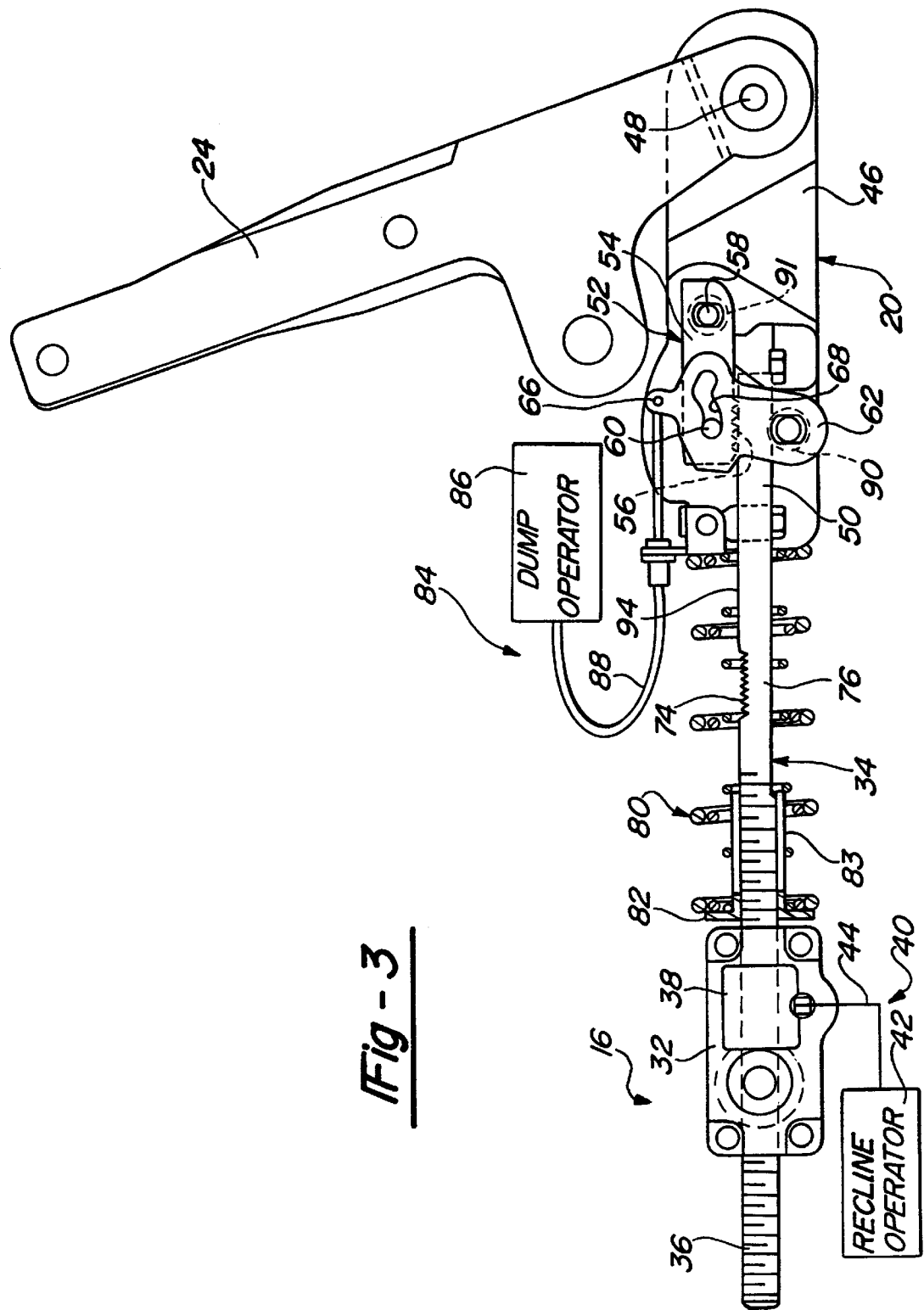
FIG. 3 is an enlarged partial view, similar to FIG. 2, showing the seat recliner with the seatback in a forwardly dumped position.

When access to the rear seating area of the vehicle's passenger compartment is desired, dump operator 86 of dump actuator 84 can be actuated to move cam plates 62 to their second position in opposition to the biasing of torsion spring 90. As noted, such rotation of cam plates 62 causes pivotal movement of locking pawl 54 from the locked position to the released position, in opposition to spring 91, for releasing locking teeth 56 from meshed engagement with memory teeth 74 on recliner rod 34. With housing 46 released from latched engagement with recliner rod 34, seatback 12 can be forwardly pivoted to its dumped position which, in turn, causes housing 46 to slide rearwardly on second end portion 50 of recliner rod 34 from the memory position to the free position. This relationship is shown in FIG. 3 wherein linear recliner 18 remains in its locked mode, spring assembly 80 has been extended and teeth 56 on locking pawl 54 are displaced from memory teeth 74 on recliner rod 34. As also seen in FIG. 3, torsion springs 90 and 92 cooperate to bias locking pawl 54 toward the locked position such that teeth 56 slide along a non-toothed surface 94 of second end portion 50 of recliner rod 34 during movement of housing 46 toward the free position. Thus, the seat occupant can release dump operator 86 once seatback 12 has been moved initially toward its dumped position.

Thereafter, when it is desired to return seatback 12 to its previous reclined position, seatback 12 is pivoted rearwardly about pivot 26, in opposition to the biasing of return spring assembly 80, which causes housing 46 to slide forwardly on second end portion 50 of recliner rod 34 toward the memory position. Once housing 46 is in the memory position, torsion springs 90 and 92 act on locking pawl 54 to forcibly urge locking teeth 56 to re-engage memory teeth 74 on recliner rod 34, thereby automatically shifting dump mechanism 20 back into its latched mode and relatching seatback 12 in its previous reclined position. To ensure that teeth 56 on locking pawl 54 completely re-engage with memory teeth 74 only in the memory position, memory teeth 74 are recessed into recliner rod 34 such that locking teeth 56 must completely disengage non-toothed surface 94 prior to "dropping" into meshed engagement with memory teeth 74.

Figure 4:
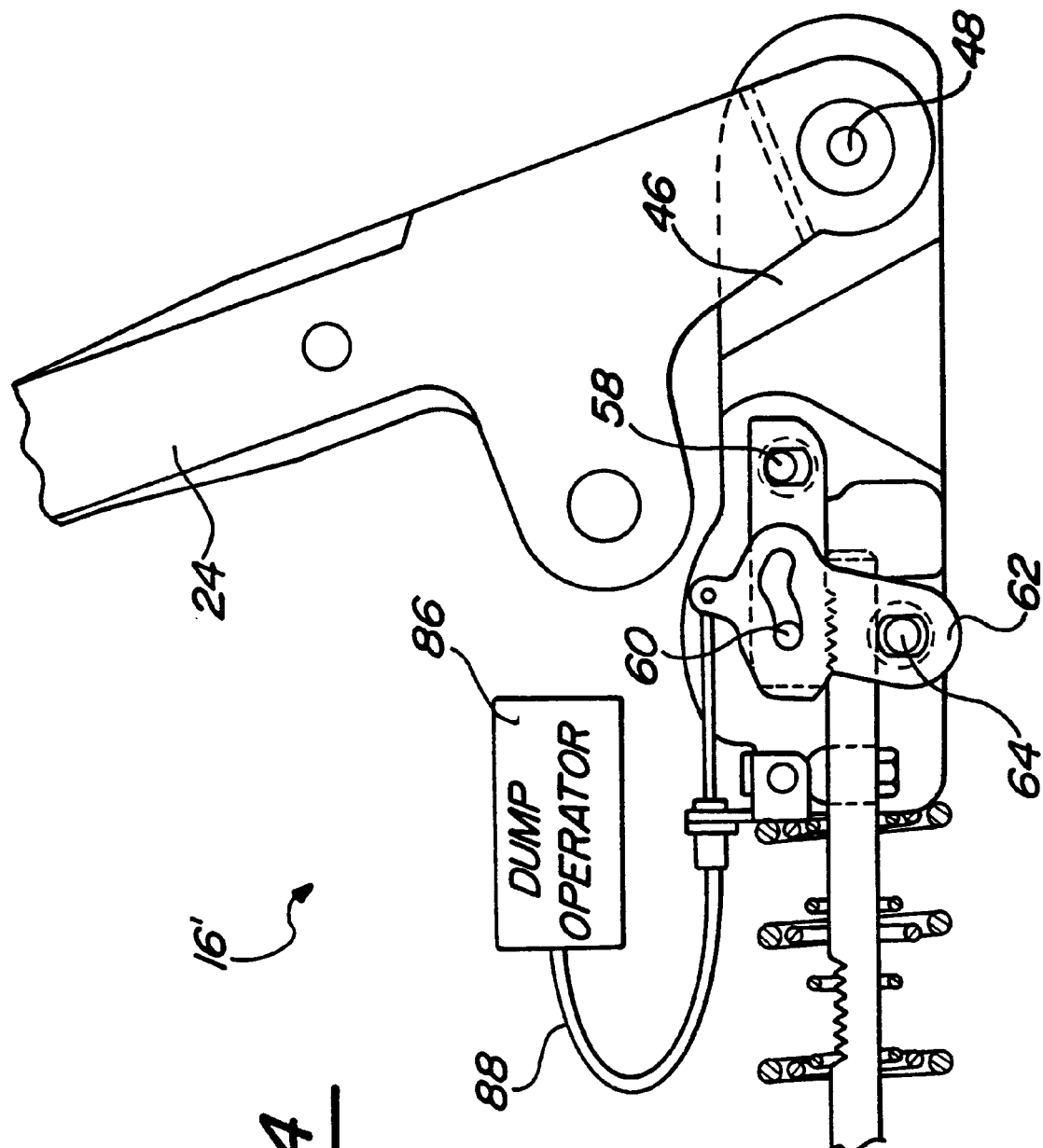
FIG. 4 is similar to FIG. 3, but shows an alternative construction for the seat recliner of the present invention.

With particular reference now to FIG. 4, a modified seat recliner 16' is shown which can be readily installed in seat assembly 10 in direct substitution for seat recliner 16. In general, seat recliner 16' is substantially similar to seat recliner 16 with the exception that dump latch assembly 52 now also functions to lockingly engage second end portion 50 of recliner rod 34 when housing 46 is in the free position for latching seatback 12 in its forward dumped position. Thus, a person entering or exiting the rear seat area of the motor vehicle can grab seatback 12 for support without seatback 12 moving out of its dumped position. To provide this secondary latching feature, a rack of dump teeth 96 are formed on second end portion 50 of recliner rod 34. As noted previously, movement of seatback 12 from its reclined position toward its dumped position causes housing 46 to slide on recliner rod 34 from the memory position toward the free position with locking pawl 54 biased such that locking teeth 56 slide on non-toothed surface 94 of recliner rod 34. Once seatback 12 is in its dumped position, springs 90 and 92 bias locking pawl 54 to the locked position shown whereat teeth 56 of locking pawl 54 drop into meshed engagement with dump teeth 96, thereby latching housing 46 to recliner rod 34 in the free position and shifting memory dump mechanism 20 back into its latched mode. Since housing 46 is inhibited from moving relative to recliner rod 34, seatback 12 is releasably latched in its forward dumped position.

Thereafter, when it is desired to return seatback 12 to its previous reclined position, dump operator 86 is again actuated to move cam plates 62 to their second position which causes locking pawl 54 to move from the locked position shown to the released position for releasing locking pawl teeth 56 from meshed engagement with dump teeth 96 on recliner rod 34. With housing 46 released from latched engagement with recliner rod 34, seatback 12 can be pivoted rearwardly from its dumped position toward its previous reclined position which, in turn, causes housing 46 to slide forwardly on second end portion 50 of recliner rod 34 from the free position toward the memory position. In the identical manner as previously described, once housing 46 is located in the memory position, locking pawl 54 moves to the locked position whereat teeth 56 re-engage memory teeth 74 on recliner rod 34 for automatically shifting dump mechanism 20 into its latched mode to relatch seatback 12 in its previous reclined position. Since the majority of the components associated with seat recliner 16' are similar to those of seat recliner 16, like reference numerals are used for identification thereof.

Figure 5:
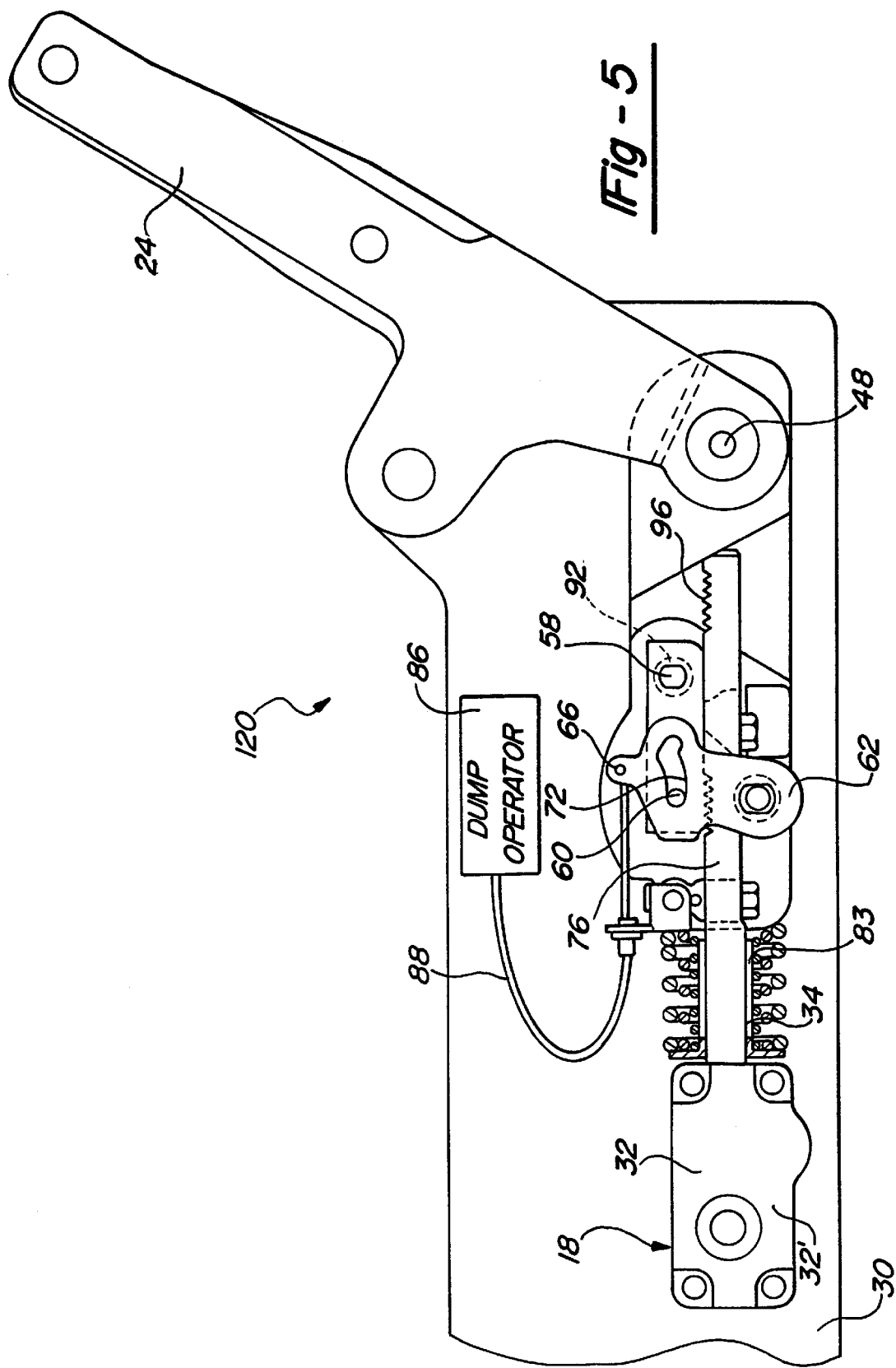
FIG. 5 is a side view similar to FIG. 2, showing a memory dump mechanism installed in a non-reclining seat assembly.

With reference to FIG. 5, seat assembly 10 is shown equipped with a seatback dump assembly 120 interconnecting seatback 12 to seat bottom 14 to permit movement of seatback 12 from a fixed "use" position to a forward dumped position. In general, seatback dump assembly 120 is similar to seat recliners 16 and 16' of FIGS. 1 through 4 with the exception that recline latch assembly 38 and recline actuator 40 of linear recliner mechanism 18 have been eliminated and first end portion 36 of recliner rod 34 is now rigidly fixed in housing 32'. Thus, recliner rod 34 is prevented from sliding relative to housing 32' and seat bottom 14 such that reclining movement of seatback 12 is not permitted.

Seatback dump assembly 120 includes memory dump mechanism 20 which is defined as operating in its latched mode when seatback 12 is in its use position and locking pawl 54 is in its locked position whereat teeth 56 engage memory teeth 74 on recliner rod 34. As before, actuation of dump actuator 84 moves cam plates 62 from their first position to their second positions which, in turn, moves locking pawl 54 to the released position. Seatback 12 can be subsequently pivoted from its use position toward its forward dumped position which causes housing 46 to slide rearwardly on second end portion 50 of recliner rod 34 from the memory position toward the free position. Once housing 46 is in the free position, springs 90 and 92 bias locking pawl 54 such that locking pawl teeth 56 drop into meshed engagement with dump teeth 96, thereby shifting dump mechanism 20 back into its latched mode. As previously described, dump actuator 84 must thereafter be actuated to move locking pawl 54 from the locked position to the released position whereat teeth 56 are released from dump teeth 96 to permit subsequent movement of seatback 12 from its forward dumped position back to its use position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat recliner for use in a seat assembly having a seatback supported for pivotal movement relative to a seat bottom, said seat recliner comprising:
   a linear recliner mechanism operable for adjusting the reclined position of the seatback, said linear recliner mechanism including a first housing adapted to be secured to the seat bottom, a recliner rod having a first end supported on said first housing, a recline latch assembly normally operable in a locked mode for inhibiting movement of said recliner rod relative to said first housing, said recline latch assembly is further operable in a released mode for permitting movement of said recliner rod relative to said first housing, and a recline actuator for shifting said recline latch assembly from its locked mode into its released mode; and
   a memory dump mechanism operable for moving the seatback between said reclined position and a forward dumped position, said memory dump mechanism including a second housing adapted to be secured to the seatback and which is supported on a second end of said recliner rod for movement thereon between a first position and a second position, a dump latch assembly normally operable in a latched mode for releasably latching said second housing to said second end of said recliner rod in said first position, said dump latch assembly further operable in an unlatched mode for permitting movement of said second housing between said first and second positions in response to movement of the seatback between said reclined and dumped positions with said recline latch assembly maintained in its locked mode, and a dump actuator for shifting said dump latch assembly from its latched mode into its unlatched mode.

2. The seat recliner of claim 1 further comprising means for releasably latching said second housing in said second position for latching said seatback in said forward dumped position.

3. The seat recliner of claim 1 further comprising means for automatically shifting said dump latch assembly into its latched mode upon the seatback being returned to said reclined position so as to relatch the seatback in said reclined position.

4. The seat recliner of claim 1 wherein said dump latch assembly of said memory dump mechanism is normally operable in its latched mode for releasably latching said second housing to said second end of said recliner rod in said first position whereat a seat occupant can selectively adjust the reclined position of the seatback by selectively shifting said recline latch assembly into its released mode, and wherein said dump latch assembly is operable in its unlatched mode for releasing said second housing from latched engagement with said second end of said recliner rod such that subsequent angular movement of said seatback towards said dumped position causes sliding movement of said second housing relative to said recliner rod from said first position toward said second position.

5. The seat recliner of claim 4 wherein movement of the seatback from said dumped position to said reclined position causes said second housing to slide from said second position to said first position whereat said dump latch assembly is automatically shifted into its latched mode for retaining said second housing in said first position and thereby retaining the seatback in said reclined position.

6. The seat recliner of claim 4 wherein said dump latch assembly includes a locking pawl mounted to said second housing for movement between a locked position engaging said second end of said recliner rod and a released position disengaged from said second end of said recliner rod, said dump actuator is operably coupled to said locking pawl for moving said locking pawl from said locked position to said released position to shift said dump latch assembly from its latched mode into its unlatched mode.

7. The seat recliner of claim 6 further comprising a biasing member for biasing said locking pawl toward said locked position.

8. The seat recliner of claim 6 wherein said recliner rod has memory teeth formed on said second end thereof which are engaged by teeth formed on said locking pawl when said locking pawl is in said locked position and said second housing is in said first position.

9. The seat recliner of claim 8 wherein said recliner rod has dump teeth formed on said second end thereof which are engaged by said locking pawl teeth when said locking pawl is in said locked position and said second housing is in said second position.

10. A seat recliner for angularly moving a seatback relative to a seat bottom, comprising:
    a linear recliner mechanism for adjusting the reclined position of the seatback, said linear recliner mechanism including a first housing adapted to be secured to the seat bottom, a recliner rod having a first portion supported from said first housing, and a recline latch operable to releasably latch said first portion of said recliner rod to said first housing and which can be selectively actuated to release said first portion of said recline rod for movement thereof relative to said first housing for adjusting the reclined position of the seatback; and
    a dump mechanism operably interconnecting a second end of said recliner rod to the seatback, said dump mechanism including a second housing adapted for mounting to the seatback and which is supported on said second end of said recliner rod for movement thereon between a first position and a second position, and a dump latch for releasably latching said second housing to said second end of said recliner rod in said first position and which can be selectively actuated to release said second housing for movement on said recliner rod from said first position to said second position.

11. The seat recliner of claim 10 wherein said dump latch is further operable to releasably latch said second housing in said second position.

12. The seat recliner of claim 10 wherein said recline latch is normally operable in a locked mode for inhibiting movement of said recliner rod relative to said first housing and said dump latch is normally operable in a latched mode for latching said second housing to said second end of said recliner rod in said first position, thereby holding the seatback in a reclined position relative to the seat bottom, and wherein said recline latch is operable in a released mode for permitting movement of said recliner rod relative to said first housing to adjust the reclined position of the seatback between an upright position and a fully-reclined position with said dump latch maintained in its latched mode.

13. The seat recliner of claim 12 wherein said dump latch is operable in an unlatched mode for permitting movement of said second housing on said second end of said recliner rod from said first position to said second position for permitting movement of the seatback from said reclined position to a forward dumped position with said recline latch maintained in its locked mode, and wherein subsequent movement of the seatback from said dumped position to said reclined position causes movement of said second housing from said second position to said first position.

14. The seat recliner of claim 13 wherein movement of the seatback from said dumped position to said reclined position causes said second housing to slide from said second position to said first position whereat said dump latch automatically is shifted into its latched mode for retaining said second housing in said first position, thereby locating the seatback in its previously reclined position.

15. The seat recliner of for selectively shifting said dump actuator for selectively shifting said dump latch from its latched mode into its unlatched mode.

16. The seat recliner of claim 15 wherein said dump latch includes a locking pawl mounted to said second housing for movement between a locked position lockingly engaging said second end of said recliner rod and a released position released from locked engagement with said second end of said recliner rod, said dump actuator is operably coupled to said locking pawl for moving said locking pawl from said locked position to said released position to shift said dump latch from its latched mode into its unlatched mode.

17. The seat recliner of claim 16 further comprising a biasing member for biasing said locking pawl toward said locked position.

18. The seat recliner of claim 16 wherein said recliner rod has memory teeth formed on said second end thereof which are engaged by teeth formed on said locking pawl when said locking pawl is in said locked position and said second housing is in said first position.

19. The seat recliner of claim 18 wherein said recliner rod has dump teeth formed on said second end thereof which are engaged by said locking pawl teeth when said locking pawl is in said locked position and said second housing is in said second position.

20. A vehicle seat comprising:
   a seat bottom;
   a seatback supported for pivotal movement relative to said seat bottom;
   a linear recliner mechanism operable for adjusting the reclined position of said seatback, said linear recliner mechanism including a first housing secured to said seat bottom, a recliner rod having a first end supported by said first housing, a recline latch normally operable in a locked mode for inhibiting movement of said recliner rod relative to said first housing and which is operable in a released mode for permitting movement of said recliner rod relative to said first housing, and a recline actuator for shifting said recline latch from said locked mode into said released mode; and
   a memory dump mechanism operable for moving said seatback between its reclined position and a forward dumped position, said memory dump mechanism including a second housing secured to said seatback and which is supported on a second end of said recliner rod for movement between a first position and a second position, a dump latch normally operable in a latched mode for latching said second housing in said first position and which is operable in an unlatched mode for permitting movement of said second housing between said first and second positions in response to movement of the seatback between said reclined and dumped positions while said recline latch is maintained in said locked mode, and a dump actuator for shifting said dump latch into said unlatched mode.

21. The vehicle seat of claim 20 wherein said dump latch is normally operable in said latched mode for retaining said second housing in said first position such that a seat occupant can selectively adjust the reclined position of said seatback by selectively shifting said recline latch into said released mode, and wherein said dump latch is selectively operable in said unlatched mode for releasing said second housing such that subsequent angular movement of said seatback towards said dumped position causes movement of said second housing relative to said recliner rod from said first position to said second position.

22. The vehicle seat of claim 21 wherein movement of said seatback from said dumped position causes said second housing to move from said second position to said first position whereat said dump latch is automatically shifted into said latched mode for latching said second housing in said first position, thereby retaining said seatback in said previously reclined position.

23. The vehicle seat of claim 21 wherein movement of said dump latch is automatically shifted into said latched mode for latching said second housing in said second position, thereby retaining said seatback in said dumped position.

24. A seat recliner for use in a seat assembly having a seatback supported for pivotal movement relative to a seat bottom, said seat recliner comprising:
   a linear recliner mechanism operable for adjusting the reclined position of the seatback, said linear recliner mechanism adapted to be secured to the seat bottom and supporting a first end of a recliner rod, said linear recliner mechanism including a recline latch normally operable in a locked mode for inhibiting movement of said recliner rod and which is operable in a released mode for permitting movement of said recliner rod, and a recline actuator for permitting said recline latch to be selectively shifted from said locked mode into said released mode; and
   a dump mechanism operable for moving the seatback between a reclined position and a forward dumped position, said dump mechanism is adapted to be secured to the seatback and is supported on a second end of said recliner rod for movement between a first position and a second position, said dump mechanism includes a dump latch normally operable in a latched mode for latching said dump mechanism in said first position and in an unlatched mode for permitting movement of said dump mechanism between said first and second positions in response to movement of the seatback between said reclined and dumped positions while said recline latch is maintained in said locked mode, and a dump actuator for permitting said dump latch to be selectively shifted from said latched mode into said unlatched mode.

25. The seat recliner of claim 24 wherein said dump latch is normally operable in said latched mode for retaining said dump mechanism in said first position such that a seat occupant can selectively adjust the reclined position of the seatback by selectively shifting said linear recline latch into said released mode, and wherein said dump latch is operable in said unlatched mode for releasing said dump mechanism such that subsequent angular movement of said seatback toward said dumped position causes sliding movement of said dump mechanism on said recliner rod from said first position to said second position.

26. The seat recliner of claim 25 wherein said dump latch is automatically shifted into said latched mode for retaining said dump mechanism in said second position and thereby retaining the seatback in said forward dumped position.

27. The seat recliner of claim 25 wherein movement of the seatback from said dumped position toward said reclined position causes said dump mechanism to slide from said second position to said first position whereat said dump latch is automatically shifted into said latched mode for retaining said dump mechanism in said first position and thereby retaining the seatback in said reclined position.

28. The seat recliner of claim 27 wherein said dump mechanism includes a housing adapted to be secured to the seatback and on which said second end of said recliner rod is supported, said dump latch includes a latch member supported on said housing for movement between locked and released positions, and a biasing member for biasing said latch member toward said locked position, said latch member operable in said locked position to establish said latched mode and in its released position to establish said unlatched mode, said dump actuator is connected to said latch member for moving said latch member from said locked position to said released position in opposition to said biasing member.

* * * * *

UNITED STATES PATENT AND TRADEMARK OFFICE
CERTIFICATE OF CORRECTION

PATENT NO. : 5,918,939
DATED : July 6, 1999
INVENTOR(S) : Lawrence J. Magadanz

It is certified that error appears in the above-identified patent and that said Letters Patent is hereby corrected as shown below:

Column 11, line 18, claim 15,
after "of", insert --claim 13 further comprising a dump actuator--.

Signed and Sealed this

Twentieth Day of February, 2001

Attest:

NICHOLAS P. GODICI

Attesting Officer

Acting Director of the United States Patent and Trademark Office